United States Patent [19]

Villalpando

[11] Patent Number: 5,740,368
[45] Date of Patent: Apr. 14, 1998

[54] METHOD AND APPARATUS FOR PROVIDING INFORMATION ON A MANAGED PERIPHERAL DEVICE TO PLURAL AGENTS

[75] Inventor: Victor Villalpando, Costa Mesa, Calif.

[73] Assignee: Canon Kabushiki Kaisha, Tokyo, Japan

[21] Appl. No.: 497,418

[22] Filed: Jun. 30, 1995

[51] Int. Cl.$^6$ ..................................................... G06F 13/42
[52] U.S. Cl. .................. 395/200.32; 395/200.6; 395/500; 395/839
[58] Field of Search ................... 395/500, 200, 395/200.31–200.35, 200.6, 835–839; 370/252

[56] References Cited

U.S. PATENT DOCUMENTS

| | | | |
|---|---|---|---|
| 4,677,611 | 6/1987 | Yanosy, Jr. et al. | 370/85 |
| 5,323,393 | 6/1994 | Barrett et al. | 370/85.8 |
| 5,367,635 | 11/1994 | Bauer et al. | 395/653 |
| 5,452,433 | 9/1995 | Nihart et al. | 395/500 |
| 5,491,796 | 2/1996 | Wanderer et al. | 395/200.09 |
| 5,519,883 | 5/1996 | White et al. | 395/840 |
| 5,537,626 | 7/1996 | Kraslavsky et al. | 395/828 |
| 5,550,807 | 8/1996 | Kuroshita | 370/252 |
| 5,592,620 | 1/1997 | Chen et al. | 395/200.01 |
| 5,592,654 | 1/1997 | Djakovic | 395/500 |
| 5,613,096 | 3/1997 | Danknick | 395/500 |

*Primary Examiner*—Christopher B. Shin
*Attorney, Agent, or Firm*—Fitzpatrick, Cella, Harper & Scinto

[57] ABSTRACT

In a system in which processing modules are coupled to each other and to peripheral devices through a network and wherein the operation of the peripheral device is managed by processing module managers employing different management protocols, the peripheral device includes plural agents each with a different management protocol to exchange data with the managers having the same management protocol. The plural agents are coupled to the managed device by an instrumentation interface which operates to translate request messages from the manager into calling signals for the managed device controller, to receive status and attribute signals from the managed device controller and to send data messages on the status and attribute signals to the requesting agent having the same management protocol as the requesting processing module manager. Alert signals from the managed device are sent to the instrumentation interface which provides data messages on the alert to the plural agents so that the processing module managers having different management protocols can interpret the alert condition of the managed device.

36 Claims, 11 Drawing Sheets

METHOD AND APPARATUS FOR PROVIDING INFORMATION ON A MANAGED PERIPHERAL DEVICE TO PLURAL AGENTS

BACKGROUND OF THE INVENTION

1. Field Of The Invention

The invention relates to networking processing modules and peripheral devices in a computer system and more particularly to interface arrangements between agents and peripheral devices managed by applications in processing modules.

2. Description Of The Related Art

In networked computer systems, agents and peripheral devices serving processing modules are connected at different points of a network. The network couples the connected processing modules which may include work stations, terminals and file servers with other processing modules and with peripheral devices Such as scanners and printers required to service applications being performed by the processing modules. Each processing module includes a manager that manages one or more peripheral devices servicing applications of the processing modules by sending request messages to an agent at the peripheral device and receiving return data on the status of and attributes of the peripheral device managed by the processing module.

U.S. Pat. No. 5,367,635 issued to Neal Bauer et al. on Nov. 22, 1994 discloses a computer network management system in which a user requesting management data of a target device on the network sends a message that is received by agent software at the target device. The agent retrieves data associated with the management request and sends the retrieved data in a packet back to the user. Data exchanged between the user and the agent are formatted in accordance with one of several predefined protocol models. The user can define a process through a text editable file which may be modified and sent to the agent of the target device so that user defined processes can be initiated at the target device. In this way, the target device is managed by the network user.

When a management request of a processing module requires information on the status or features of a managed controlled device, the agent can send a signal calling for return signals as to a status or an attribute of the managed device to a controller in the managed device through an interface between the agent and the managed device. The interface receives signals from the controller and generates data reflecting the peripheral device status. Upon receiving the status data from the interface, the agent generates data for a return message from the interface data, formats the data by means of its embedded management protocol and sends the formatted data message to the processing module manager in the format of its embedded management protocol.

The messaging through the network may be performed using one of several available protocols. The processing module application may, for example, use an OSI protocol model, a TCP/IP protocol model or another protocol model to exchange information. If the OSI protocol model is employed, the CMIP management protocol is used for peripheral device management. Alternatively, the application may use the TCP/IP protocol model which includes the SNMP management protocol for peripheral device management. The management protocols are generally embedded in the processing module and the peripheral device when these units are manufactured. As a result, there is a limitation on the interconnection capability in the network. Since the processing module and the peripheral device may come from different sources, the management protocol embedded in the manager at the processing module may not be the same as the management protocol embedded in the agent at the device. If the management protocols are different, request messages sent by the manager which are restricted to one protocol cannot be interpreted by the agent at the managed device and the return data from the device agent cannot be interpreted by the manager at the processing module.

The agent must also communicate with the managed device on events such as an alarm and send formatted messages on the alarm to the processing module manager. When the management protocol of the processing module manager is different from that of the agent of the managed device, the data formatted by the agent and sent to the manager cannot be interpreted as a response to the manager request. When one agent is interfaced with the managed device, the event signals received by the agent from the managed device may be sent using a management protocol different than that of the processing module manager so that the data packet reaching the processing module manager cannot be correctly interpreted. Accordingly, it is a problem in a networked computer system to provide arrangements for exchange of management information between processing modules and peripheral devices through the required protocols.

SUMMARY OF THE INVENTION

The invention is directed to a networked computer system in which processing modules and peripheral devices serving the processing modules are coupled via a network. Each processing module has a manager operating under a predetermined one of plural management protocols that manages the peripheral devices. Each peripheral device has plural agents for exchanging management information with the processing module managers over the network and each of the agents operates under a different one of the plural management protocols. An interface between the agents and the managed peripheral device responds to an information request from the one of the plural agents operating under the same management protocol as the processing module manager requesting the device information by generating a call signal calling for signals from the managed peripheral device corresponding to information requested by the manager. Data corresponding to the manager requested information is generated in the interface in response to the signals returned by the managed peripheral device and the generated data is sent to the agent operating under the same management protocol as the processing module manager.

According to one aspect of the invention, the interface between the plural agents and the managed peripheral device receives signals from the managed peripheral device corresponding to events occurring in the device. Data is generated in the interface responsive the received signals. The generated data is sent to each agent operating under the same management protocol as the manager of the processing module using the managed peripheral device. Each agent sends the data on the managed peripheral device event to the processing module managers operating under the same management protocol as that of the agent.

DETAILED DESCRIPTION OF THE PREFERRED EMBODIMENT

Figure 1:
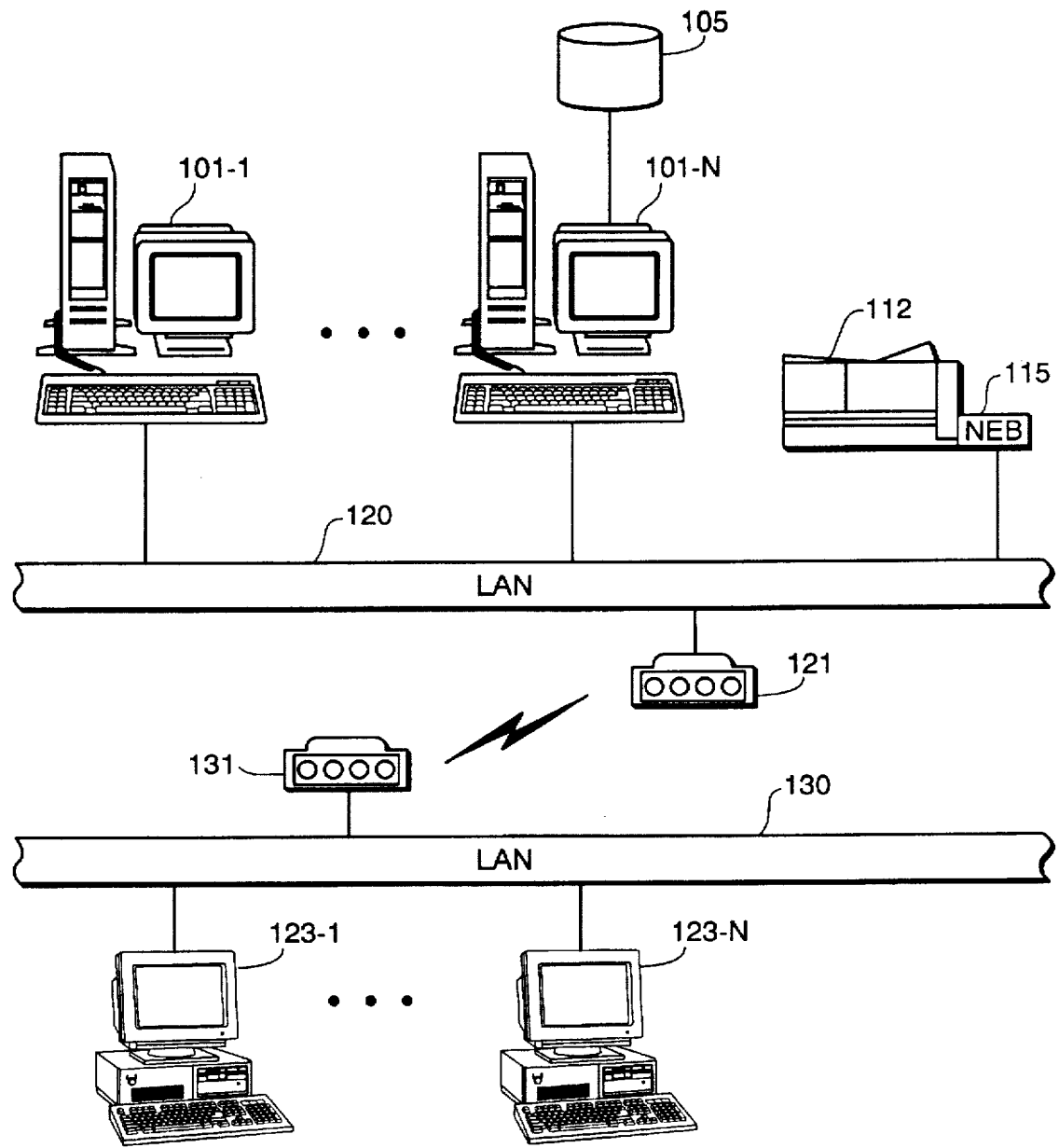
FIG. 1 depicts a computer network structure having an arrangement of processing modules and peripheral devices connected to interconnected local area networks.

FIG. 1 shows a computer system in which plural processing modules and peripheral devices are coupled through interconnected local area networks (LAN). Referring to FIG. 1, there are shown LANs 120 and 130, work stations 101-1 through 101-N, terminals 123-1 through 123-N, a printer 112, a network expansion board 115 at the printer 112, a disk drive unit 105 and wireless coupling modules 121 and 131. Work stations 101-1 through 101-N are connected to the LAN 120 and terminals 123-1 through 123-N to the LAN 130. The printer 112 is coupled to the LAN 120 through the network interface board 115 and the disk drive unit 105 is connected to the work station 101-N.

As is well known in the art, the arrangement of FIG. 1 permits each processing module to utilize the resources of the other processing modules and peripheral devices connected to the network although the processing modules and the other network resource devices may be located in different offices, on different floors of the same building or in different buildings. For example, the terminal 123-1 can be coupled to the printer 112 or to the disk device 105 connected to work station 101-N so that the special services provided by the printer 112 and the work station 101-N may be utilized by a user at terminal 123-1. Coupling of processing modules with other processing modules and peripheral devices is performed by exchanging data packets through the network using a standard protocol. The OSI and the TCP/IP protocol models are in common use and permit exchange of data among the different apparatus connected to the network.

Figure 2:
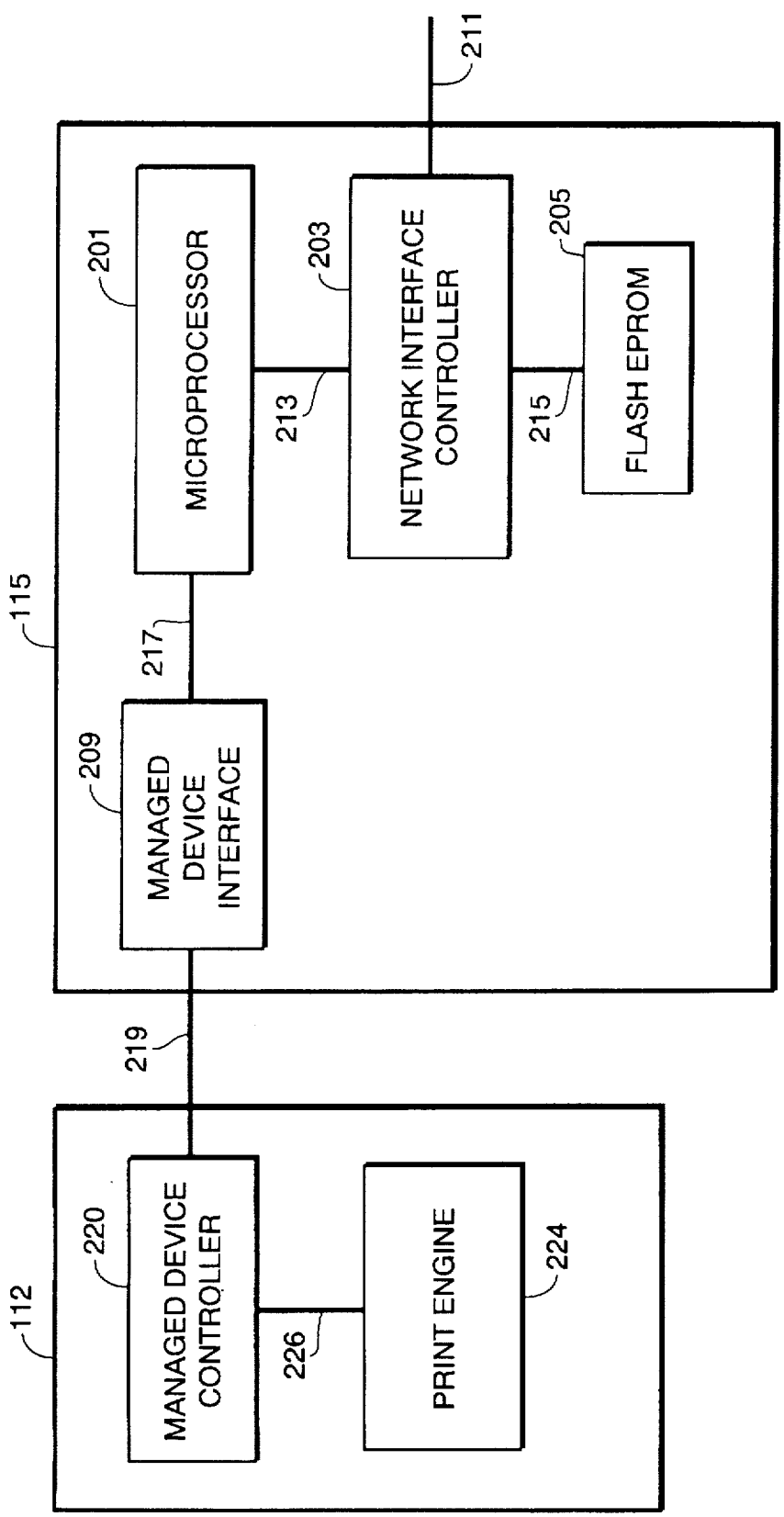
FIG. 2 is general block diagram of a network interface board connected between a local area network and a network printer.

FIG. 2 is a general block diagram of the network expansion board (NEB) 115 connected between the LAN 120 and the printer 112. The NEB 115 provides hardware, software and firmware that permits a network peripheral, such as a printer, to be an intelligent, interactive network member that receives and processes data from the network, and also transmits to the network significant amounts of data about the peripheral device such as detailed status information and operational parameters. The NEB 115 may also be used to connect other peripheral devices such as facsimile devices, copiers, image processors or peripheral devices in which facsimile, copying and image processing are combined into one unit to the network.

Referring to FIG. 2, the NEB 115 includes a microprocessor 201, a network interface controller 203, a flash or electrically programmable memory 205 and a managed device interface 209. The microprocessor 201 may preferably be an Intel 80C188EA-20 8-bit processor, the details of which can be found in the 80C186EA/80188EA User's Manual, Intel p/n 270950-001, Intel Corp. This processor is an 8-bit processor with direct memory access (DMA), interrupts, timers, and a DRAM refresh control. Other microprocessors, such as an AMD 80C188-20 8-bit microprocessor, might alternatively be used. The printer 112 includes a device controller 220 and a print engine 224.

The network interface controller 203 is coupled to the LAN 120 through a cable 211, to microprocessor 201 through a line 213 and to the flash memory 205 through a line 215. The device interface 209 is coupled to the microprocessor 201 through a line 217 and is further coupled to the device controller 220 through cable 219. In the printer 112, the device controller 220 is coupled to the print engine 224 via a line 226. The device interface 209 allows extensive printer status and control information to be exported to NEB 115 and thence to an external network node so as to allow programming of many useful support functions. In the NEB 115, blocks of print image data and control information are assembled by the microprocessor 201, are written into a shared memory of the device control interface 209, and are then read by printer controller 220. Likewise, printer status information is transferred from printer controller 220 to the shared memory of the device interface 209, from which it is read by the microprocessor 201.

In operation, the network interface controller 203 receives data and control information from a processing module which it serves via the LAN 120 and the line 211 and sends status information on the printer 112 to the processing module using the printer through the LAN 120. The device control interface 209 transfers print data and control information data received from the microprocessor 201 to the device controller 220 of printer 112 and transfers status signals from the device controller 220 to the microprocessor 201. The status signals may include information on transient state; on-line, printing; off-line, not printing; engine test detected; maintenance program running; in sleep mode; paper out; printer open; paper jam; no EP cartridge; toner low; U-L feed; load paper; feed paper; CaPSL operator call; upper feeder reject; middle feeder reject; lower feeder reject; set upper; set middle; paper drain; tray full; page full; 22 LINE ERROR; 40 LINE ERROR; download memory full; working memory full; deadlock memory full; job reject; print check; font full; engine warming up; external operator call; front card removal; NVRAM full; hard disk full; memory full; low resolution, can't switch to low; hard disk crash; "please power off"; full paint reject; scale error; duplex reject; expansion I/O error; tray trouble; resident ROM: bad format; not supported option; no option font; unavoidable memory full; service call is active; starting state; going off-line; going on-line; off-line, not printing, in a menu; transient, menu finished, return to OFFLINE; panel reset requested; SWOFF detected (power down request); reboot system; panel form feed requested; panel form feed cancelled; external program test print; test print cancelled; maintenance program done.

The device interface 209 includes a shared buffer memory to store data being transferred and a control logic unit that directs the flow of information between the microprocessor 201 and the device controller 220 or other arrangements well known in the art. The arrangement of the network interface controller 203, the microprocessor 201 and the device control interface 209 provide bidirectional information exchange between the printer 112 and the processing module using the printer. Examples of bidirectional network interfaces are described in U.S. Pat. No. 5,323,393, which describes a network device having a bi-directional SCSI interface and U.S. patent application Ser. No. 08/336,062, entitled "Network Protocol Sensor", which describes a network device having a bi-directional shared memory interface.

Figure 11:
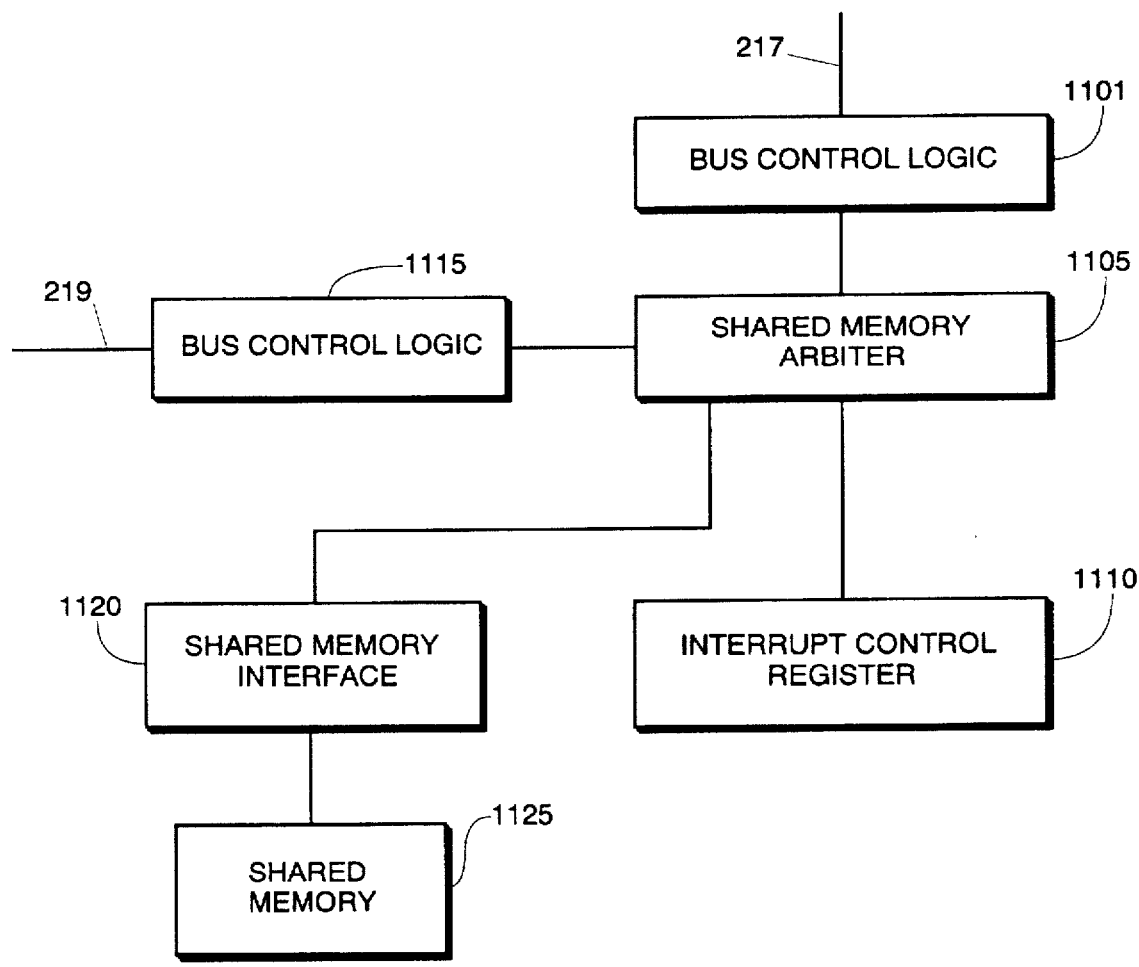
FIG. 11 is a more detailed block diagram of the control device interface of FIG. 2.

FIG. 11 is a more detailed block diagram of the device control interface 209. The controlled device interface 209 includes a shared memory 1125, a shared memory interface 1120, a shared memory arbiter 1105, an interrupt control register 1110 and bus control logic units 1101 and 1115. Referring to FIG. 11, the bus control logic 1101 communicates with the microprocessor 201 and the managed device controller 220 communicates with bus control logic 1115. Memory accesses from the bus of the managed device controller 220 and the bus of the microprocessor 201 are routed to the shared memory arbiter 1105 which determines the priority of the buses and permits the bus having priority to access the shared memory 1125. The interrupt control register 1110 also accessed through the shared memory arbiter 1105 allows interruption of one of the microprocessor 201 and the managed device controller 220 by the other.

In operation, the controlled device interface 209 interleaves concurrent accesses of the microprocessor 201 and the controller 220 by allowing access to shared memory 1125 on a first-come, first-serve basis. The lower priority unit of the microprocessor 201 and the controller 220 is presented with a wait state while the higher priority unit has access to the shared memory 1125. In the event of simultaneous access requests, the microprocessor 201 is given priority. A large portion of the shared memory 1125 has a ring buffer structure into which the microprocessor 201 writes print data and from which the printer controller 220 reads the print data. As the writing and reading of data blocks proceeds, the microprocessor 201 and the controller 220 update their respective "put" and "get" pointers to indicate the next location that should be accessed. By comparing the "put" and "get" pointer, the writing unit of microprocessor 201 and controller 220 can then determine the availability of memory space and the reading unit can determine whether there is data to be read. Contention for the shared memory 1125 is reduced by allowing the printer controller 220 sole access to the shared memory 1125 until its reading catches up with the writing of the microprocessor 201.

As is well known, the operations of a peripheral device such as printer 112 in servicing processing modules such as work stations 101-1 and 101-N through the LAN 120 are managed from the processing modules. In running an application, a manager in the processing module exchanges messages in the form of packet data units with an agent residing in the flash memory 205 of the NEB to manage the operations of the printer 112 in the application. The packet data units (PDUs) sent by the processing module manager 301 employ a predefined management protocol in sending PDUs to the agents residing in the NEB 115 and in receiving PDUs from the network coupled NEB manager. In prior art arrangements, each managed peripheral device has one preset agent for information exchange with processing module managers over a network. This agent uses a fixed management protocol for exchange of PDUs. In current practice, the protocols for the manager for the processing module and the agent for the peripheral device are embedded prior to installation in the network of FIG. 1. If the management protocol of the agent is different than the management protocol of the processing module manager, neither PDUs received at the managed device agent or at the processing module manager are correctly interpreted.

In accordance with the invention, an agent is provided for each management protocol and an instrumentation interface exchanges signals and data between the agent receiving an information request from a processing module manager and the managed peripheral device so that the proper management protocol is employed in sending PDUs to the processing module manager. By providing plural agents with different management protocols in the peripheral device, the peripheral device can be managed by any of the processing module managers without alteration of the network. In the event that a new peripheral device with the features of the invention is added to a networked computer system, it is fully compatible with all processing modules in the system.

Figure 3:
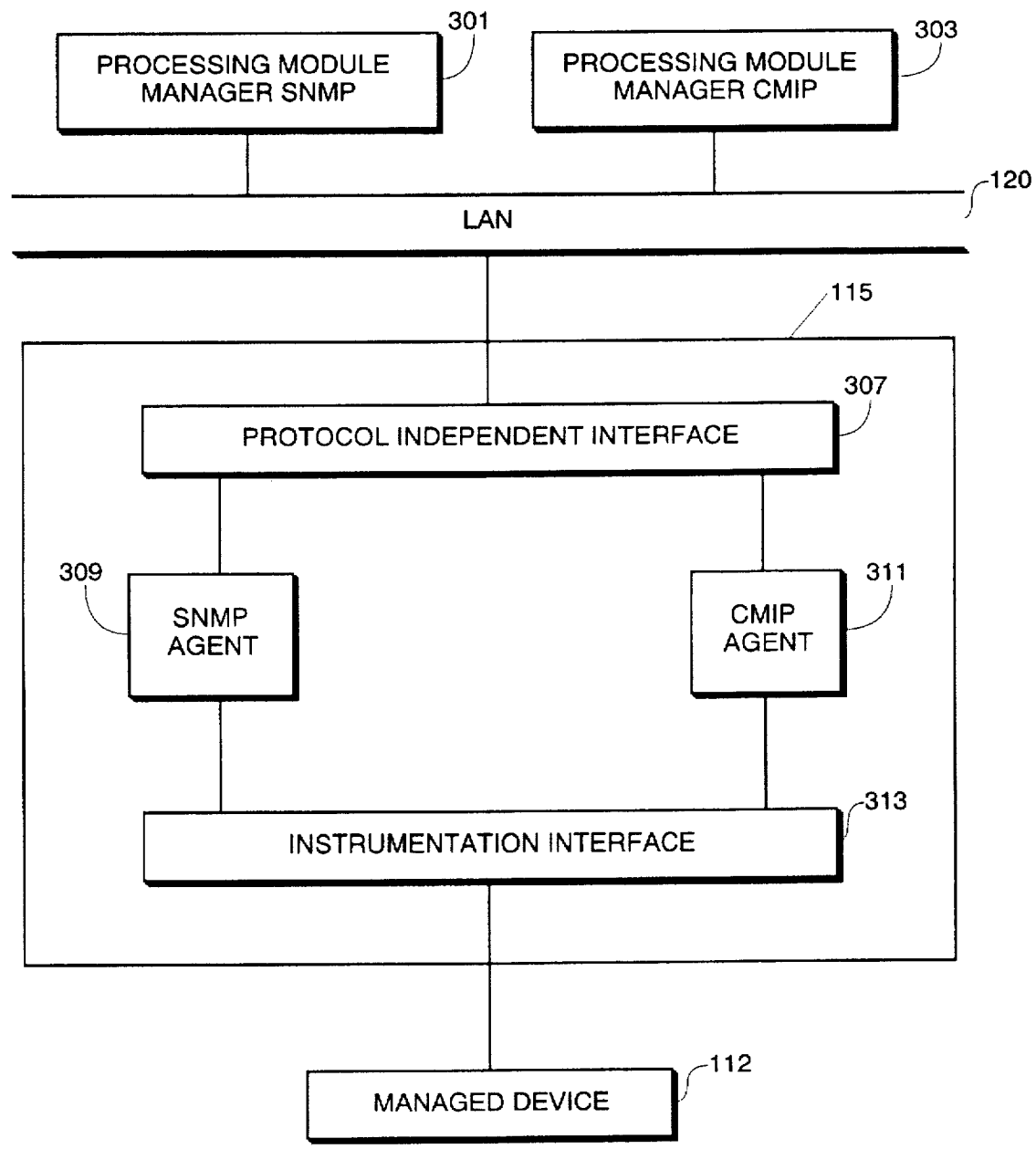
FIG. 3 is a diagram illustrating the arrangement of agents with instrumentation and network interfaces in the network interface board of FIG. 2 according to the invention.

FIG. 3 illustrates diagrammatically the management arrangements according to the invention. In FIG. 3, there are shown processing managers 301 and 303 which reside in different ones of the processing modules of the computer network of FIG. 1, the managed device 112 and a protocol interface 307, an SNMP agent 309, a CMIP agent 311 and an instrumentation interface 313 which reside in the NEB 115. When a PDU is received by the agent 309 operating under a management protocol for SNMP that is the same as that of the processing module manager 301 making the request, data corresponding to the PDU of the request is translated into a call signal which is sent to the controller 220 of the managed device 112 by the instrumentation interface 313. Signals returned by the managed device controller 220 are converted to data which is sent to the SNMP agent 309 and a PDU formatted from the managed device data is sent to the processing module manager 301 in the format of the management protocol for SNMP.

Figure 4:
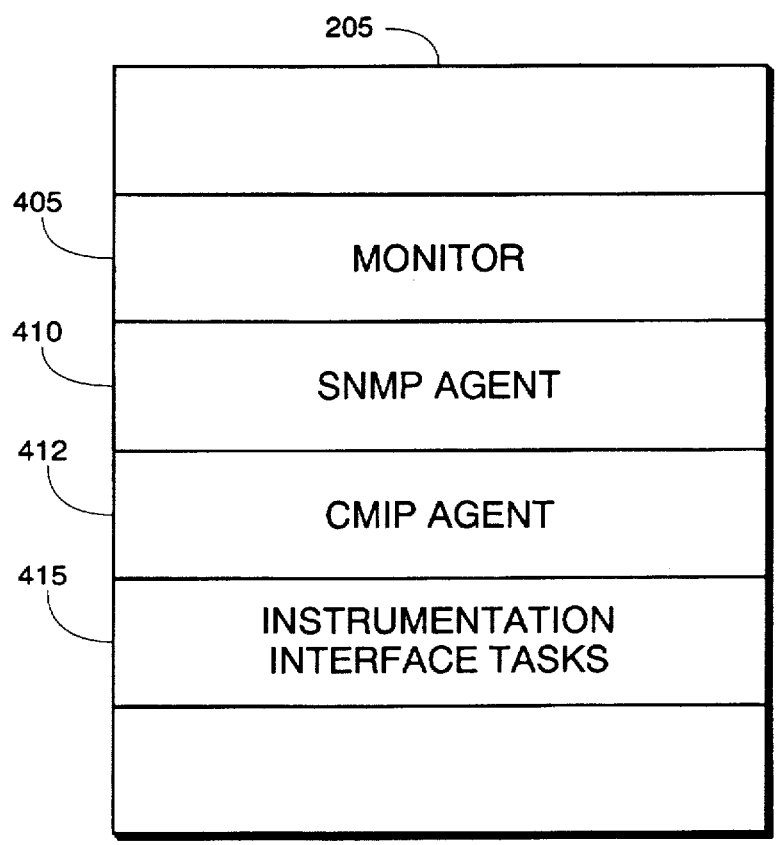
FIG. 4 shows an arrangement of software modules in the control memory of the network interface board of FIG. 2.

All of the functions performed by the NEB 115 are controlled by the instructions stored in the memory 205. FIG. 4 shows the block arrangement of the flash memory 205 with respect to interfacing the transfer of data and signals exchanged between the microprocessor 201 and the managed device controller 220. The structure of memory 205 in FIG. 4 includes a monitor block 405, an SNMP agent block 410, a CMIP agent block 412 and an instrumentation interface task block 415. The instruction codes stored in each of these blocks control the microprocessor 201 to perform the operations shown in the flow charts of FIGS. 6–8.

Figure 10:
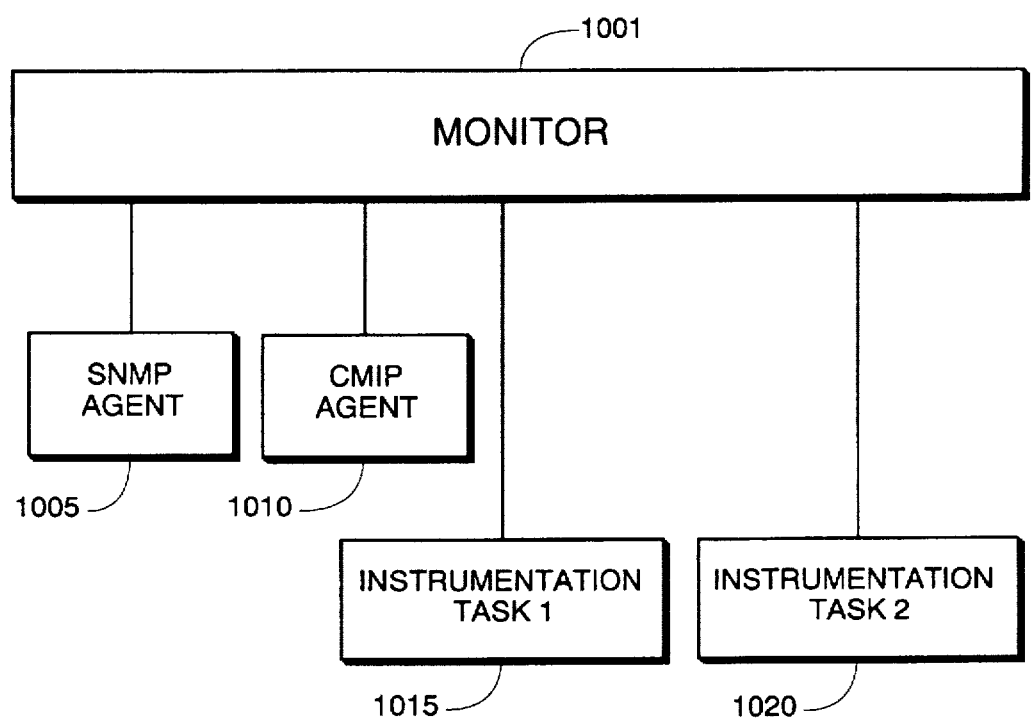
FIG. 10 illustrates the sequencing of operations in the instrumentation interface shown in the flow charts of FIGS. 6–8.

The monitor block 405 provides instructions to the microprocessor 201 to sequentially activate the SNMP agent block 410, the CMIP agent block 412 and the instrumentation interface task block 415 as illustrated in the diagram of FIG. 10. Referring to FIG. 10, the monitor 1001 operates to activate an SNMP module 1005 corresponding to block 410. In response, the SNMP module 1005 controls the microprocessor to perform operations stored in the SNMP agent block 410 and to provide a path for data to be sent to the instrumentation interface task modules 1015 or 1020 corresponding to the block 415, as required. Upon completion of SNMP agent operations by the microprocessor and notification of data for transfer to the monitor, the CMIP module 1010 corresponding to block 412 is activated and the SNMP module 1005 is deactivated. After the CMIP agent module functions are performed and the monitor module is notified of data for transfer, it is deactivated and the instrumentation interface task 1 module 1015 of block 415 is activated to provide call signals to the managed device controller 220 and to receive status and attribute signals from the managed device controller. When the operations directed by the instrumentation interface task 1 module 1015 are completed, it is deactivated and the instrumentation interface task 2 module 1020 of the block 415 is activated to perform a different set of signal and data transfer with the managed device controller 220. The cycle of operation is then repeated. It is to be understood that the memory 205 may include other blocks and that the monitor module may sequentially activate modules in addition to those shown in FIG. 10.

Figure 5:
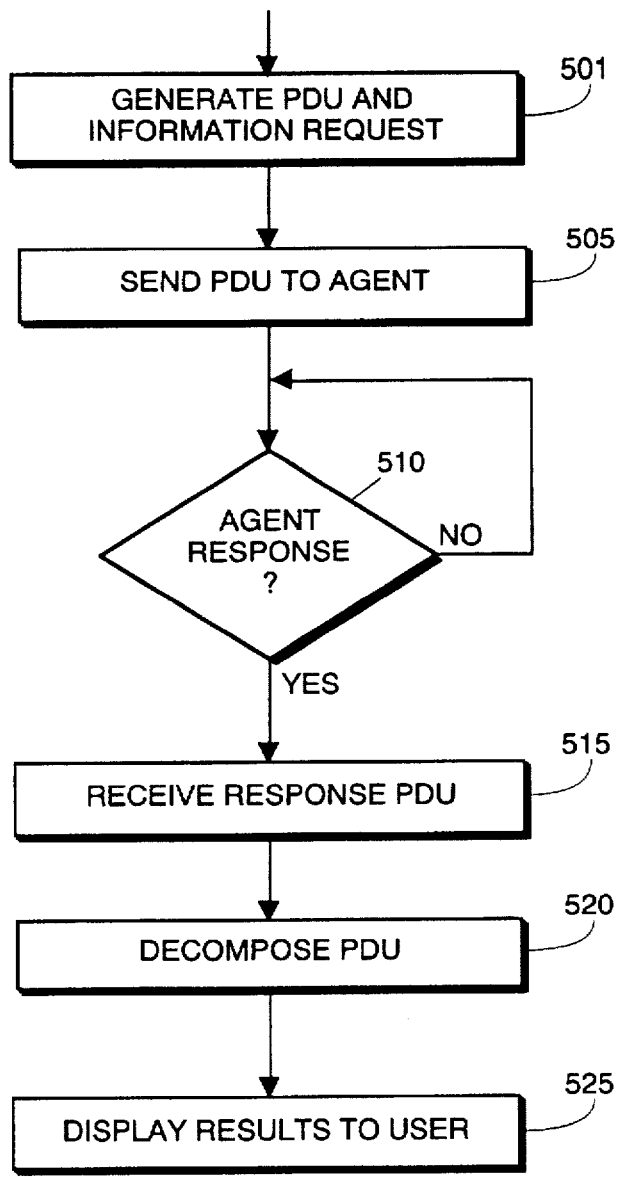
FIG. 5 is a flow chart illustrating the operative of a processing module manager in exchanging data with an agent of a managed peripheral device.

The exchange of data for a management information request operation is illustrated in the flow charts of FIGS. 5–8. FIG. 5 shows the operation of the processing module manager (e.g. SNMP manager 301) in the information request process. Referring to FIG. 5, a PDU is generated in the SNMP manager 301 in step 501 and the PDU is directed to the SNMP agent 309 in the NEB 115 (step 505). The manager 301 then awaits a response from the SNMP agent 309 of NEB 115 in step 510. When the response PDU is received in step 515 and it is decomposed according to the management protocol for SNMP by the SNMP manager 301 in step 520 and the results of the information request obtained from the managed device 112 are then displayed (step 525).

Figure 6:
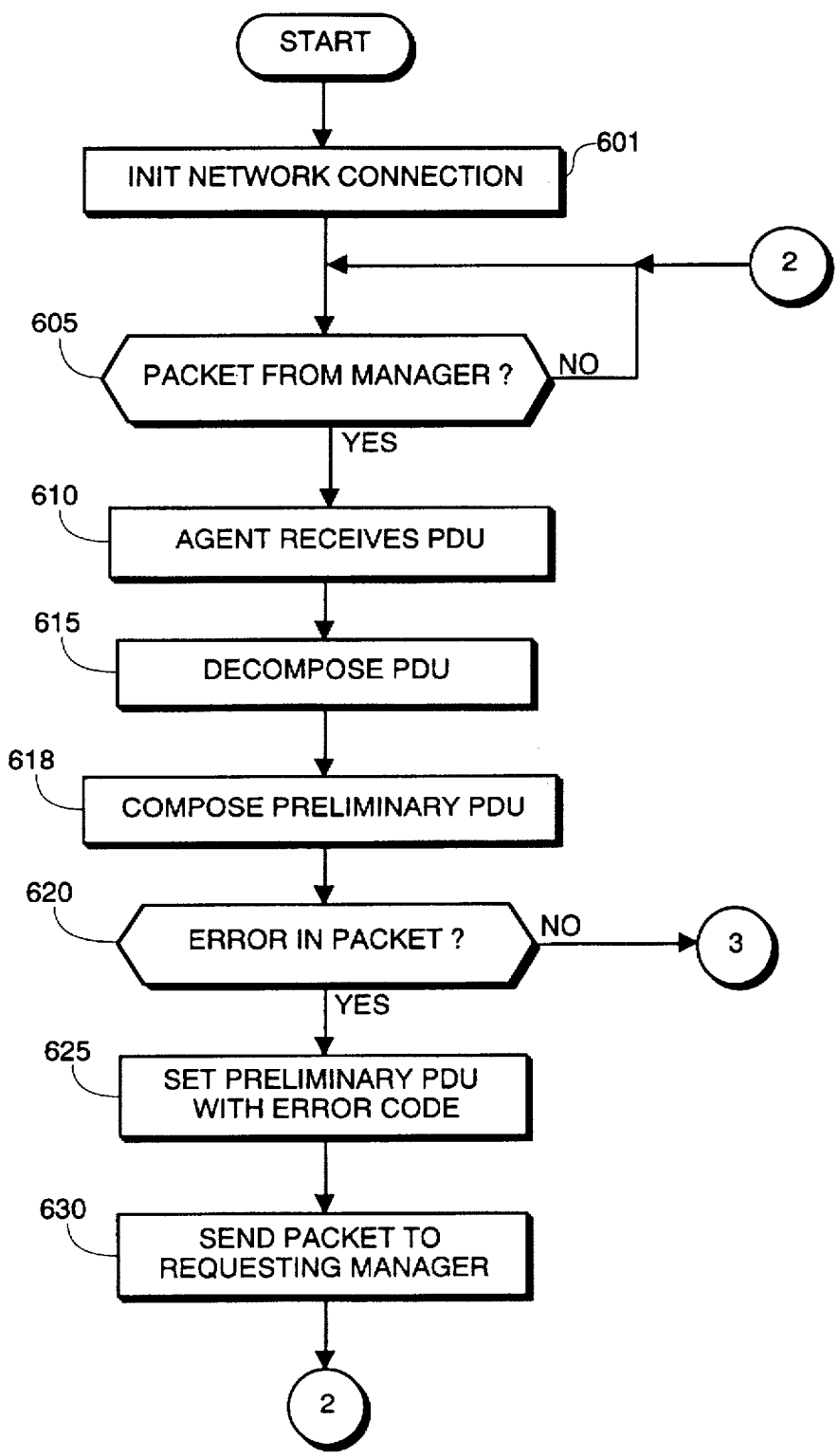
FIGS. 6–8 are flow charts illustrating the operation of an instrumentation interface between the managed device and agents of the managed device responsive to a processing module manager information request in accordance with the invention.
Figure 7:
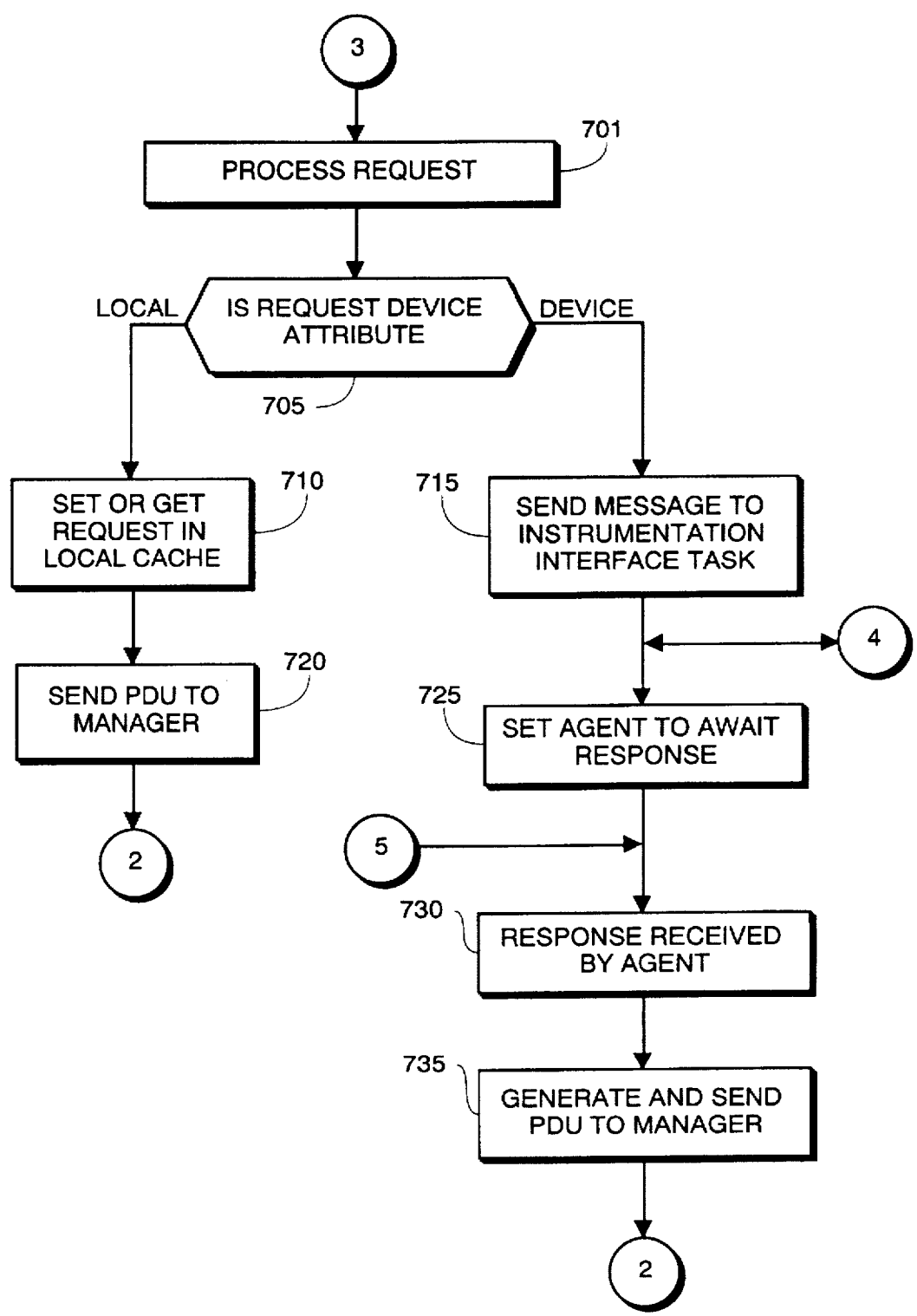
Figure 8:
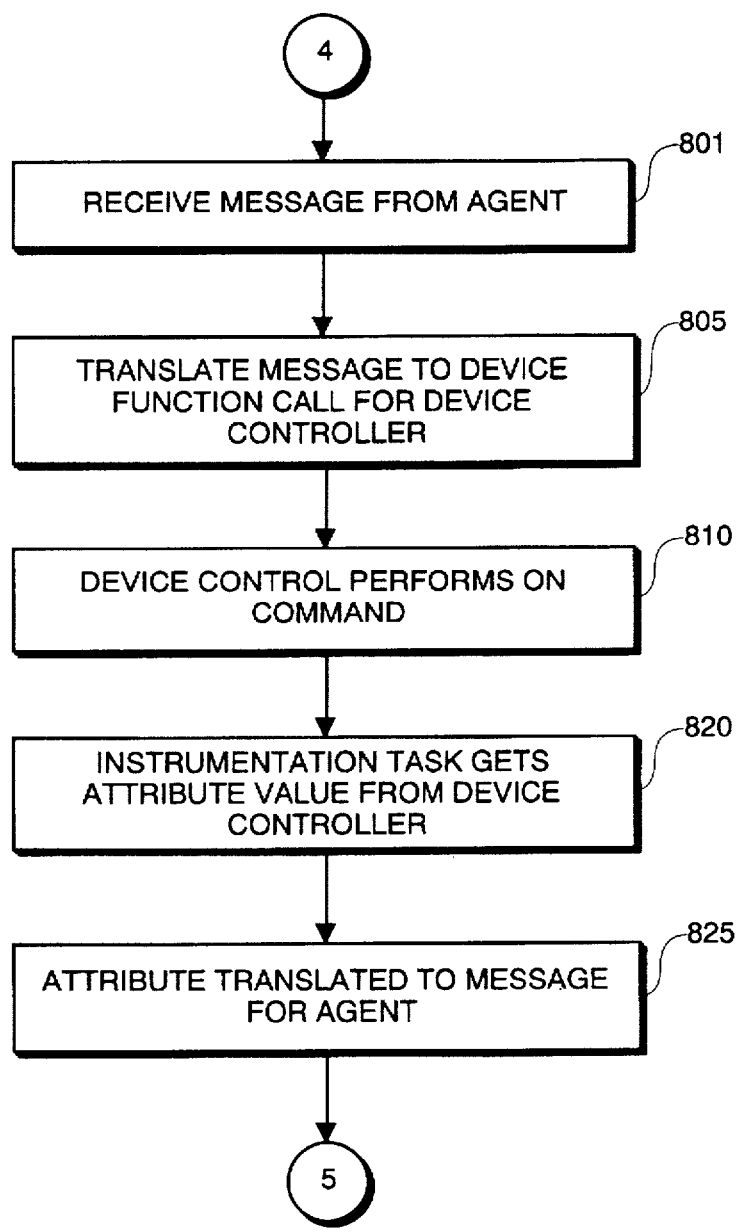

FIGS. 6–8 illustrate the operations of the microprocessor 201 and the managed device interface 209 directed by the SNMP agent block 410, the instrumentation interface task block 415 and the controller 220 of the managed device 112 in response to the PDU request of the SNMP manager 301. Referring to FIG. 6, a network connection is initiated by the management information request in step 601. When a packet is received by the SNMP agent 309 via the protocol interface, 307 of FIG. 3 (steps 605 and 610), it is decomposed in step 615 and a preliminary PDU is composed to return data responsive to the manager request (step 618). The processing is then checked for errors in decision step 620. If an error is detected, an appropriate error code is set and put into the PDU (step 625) and an error data packet is sent to the requesting processing module manager 309 via the protocol independent interface 307 and the LAN 120. Control is then passed to decision step 605 in which a manager packet is awaited.

In the event no error is detected, step 701 of FIG. 7 is entered. A process request is issued and control is passed to decision step 705. It is then determined whether the request is one for a device attribute or for a local attribute stored in the NEB 115. When a local attribute has been requested, a "set" request or a "get" request is generated for local cache in the NEB 115 in step 710. The SNMP agent then forms a PDU with the requested data, sends the PDU to the processing module manager which provides data on the requested information and control is passed to step 605. If it is determined in decision step 705 that the request is for a device attribute, step 715 is entered and a request message is sent by the sequencing control of the monitor block 405 to the instrumentation interface task block 415. The SNMP agent 309 then enters step 730 to await a response from the instrumentation interface task through the monitor.

Referring to FIG. 8, step 801 is entered from step 715 of FIG. 7 and the instrumentation interface task receives the message from the SNMP agent 309 through the monitor sequencing. The message from the SNMP agent 309 is translated to a managed device function call signal by the instrumentation interface task and the function call signal is sent to the controller 220 of the managed device (step 805). The managed device controller 220 then performs the command of the called function (step 810) and the device controller 220 returns a status or attribute value signal to the instrumentation interface task in the NEB 115 (step 820). The attribute or status value received by the instrumentation interface task is translated to a data message for the agent 309 by the instrumentation interface task block and is sent via the monitor sequencing to the SNMP agent 309 in step 825. Step 730 of FIG. 7 is then entered through the waiting step 725 and the SNMP agent receives the attribute or status message. A response PDU is generated in the SNMP agent which sends the response PDU to the requesting processing module manager through the protocol interface 307 (step 735). Control is then passed to step 605 of FIG. 6 to await a packet from a processing module manager.

Figure 9:
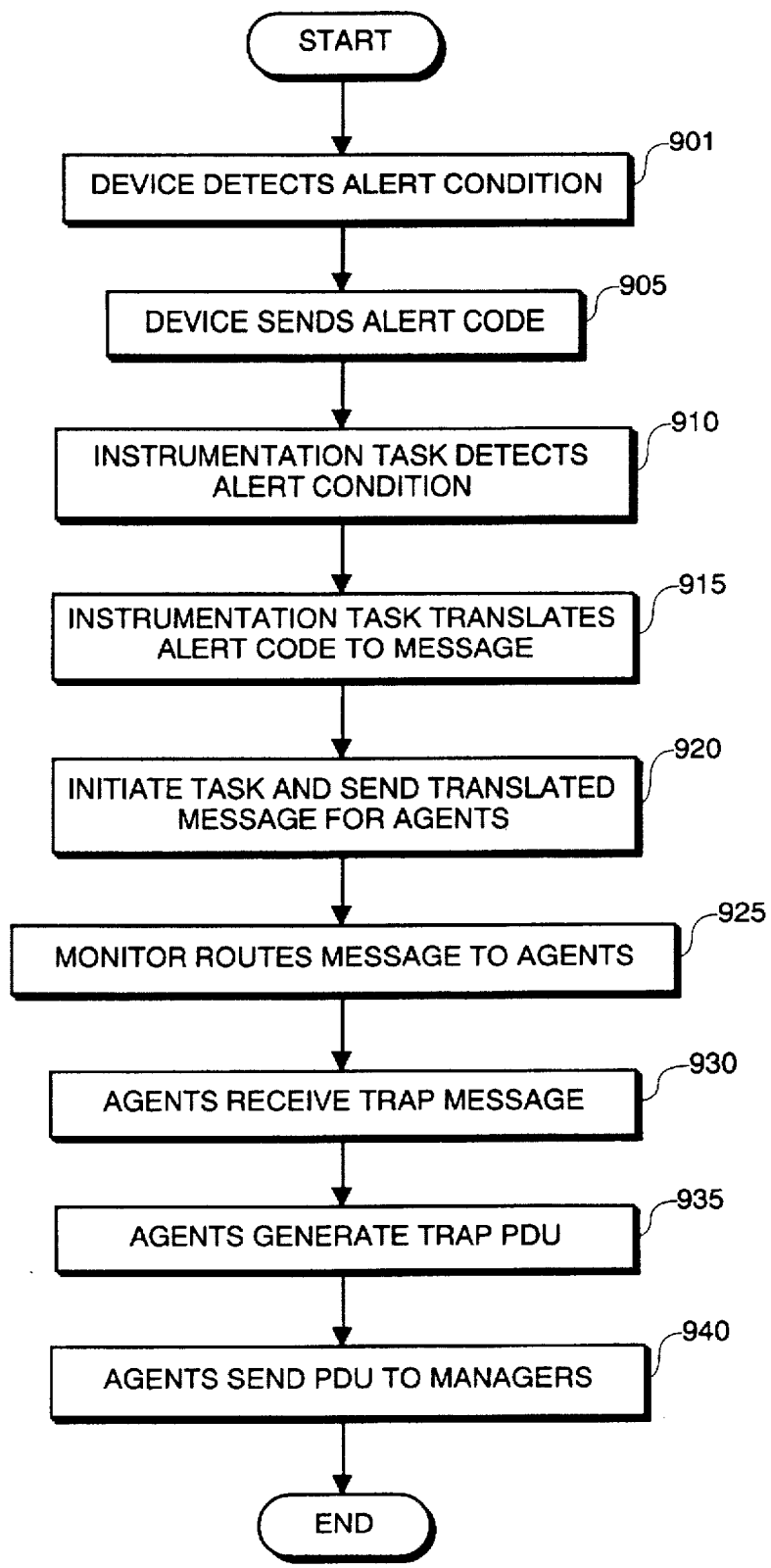
FIG. 9 is a flow chart illustrating the operation of the instrumentation interface of FIG. 4 in response to an alert condition of the managed device.

FIG. 9 illustrates the transfer of information on an alert condition such as a paper jam in the managed device using the instrumentation interface task 2 to provide a status message to all the processing module managers in communication with the printer 112. In the operation shown in FIG. 9, the device controller 220 detects an alert condition such as a paper jam in the print engine 224 in step 901. The device sends a coded signal to the managed device interface 209 (step 905). The coded signal is detected by the instrumentation interface task 2 when it is activated by the monitor (step 910) and the coded signal on the paper jam from controller 220 is translated into an alert data message by the instrumentation interface task 2 (step 915). The alert data message is sent to the monitor from the instrumentation interface task (step 920) and is routed by the monitor to the SNMP agent 309 and the CMIP agent 311 (step 925). The agents 309 and 311 receive the alert message in step 930 via the monitor and generate trap messages in step 935. Each agent then forms a PDU reporting the paper jam alert and sends the PDU in to the processing module manager having the same management protocol (step 940). Accordingly, the information on the paper jam alert is properly interpreted by all processing module manager independently of the management protocol residing in the manager.

While preferred embodiments of the invention have been described, it is to be understood that the invention is not limited to the above described embodiments and that various changes and modifications may be made by those of ordinary skill in the art without departing from the spirit and scope of the invention.

What is claimed is:

1. In a computer system having plural processing modules and at least one peripheral device coupled via a network, each processing module including a manager for managing the at least one peripheral device using a predetermined one of plural management protocols and the at least one peripheral device having plural agents each using a different one of the predetermined management protocols for exchanging management information with the managers over the network, apparatus for interfacing the plural agents with the managed peripheral device, comprising:

receiving means for receiving an information request from the one of the plural agents operating under the same management protocol as the management protocol of a manager requesting information;

determining means for determining whether the information request is for local information stored on the apparatus or for information stored on the managed peripheral device;

sending means for sending a calling signal to the managed peripheral device for information on the managed peripheral device in a case that the information request is for information on the managed peripheral device;

receiving means for receiving information signals from the managed peripheral device in response to the calling signal;

generating means for generating data on the managed peripheral device in response to the information signals in the case that the information request is for information on the managed peripheral device; and sending means for sending, to the one of the plural agents operating under the same management protocol as the requesting manager, (1) the data generated by the generating means in the case that the information request is for information on the managed peripheral device, and (2) local information in the case that the information request is for local information.

2. The apparatus of claim 1, wherein the information signals are managed device status signals.

3. The apparatus of claim 1, wherein the information signals are managed device attribute signals.

4. The apparatus of claim 1, wherein the plural agents include an agent operating under an SNMP management protocol.

5. The apparatus of claim 1, wherein the plural agents include an agent operating under a CMIP management protocol.

6. In a computer system having plural processing modules and at least one peripheral device coupled via a network, each processing module including a manager for managing the at least one peripheral device using a predetermined one of plural management protocols and the at least one peripheral device having plural agents each using a different one of the predetermined management protocols for exchanging management information with the managers over the network, a method for use with an apparatus that interfaces the plural agents with the managed peripheral device, comprising the steps of:

receiving an information request from one of the plural agents operating under the same management protocol as the management protocol of a manager requesting information; and determining whether the information request is for local information stored on the apparatus or for information stored on the managed peripheral device;

wherein, in a case that the determining step determines that the request is for information on the managed peripheral device, the method comprises:

sending a calling signal to the managed peripheral device calling for information on the managed peripheral device;

receiving information signals from the managed peripheral device in response to the calling signal;

generating data corresponding to the information signals from the managed device; and sending the generated data to the one agent operating under the same management protocol as the management protocol of the requesting manager; and wherein, in a case that the determining step determines that the request is for local information, the method comprises providing the local information to the one agent operating under the same management protocol as the management protocol of the requesting manager.

7. The method of claim 6, wherein the information signals are managed device status signals.

8. The method of claim 6, wherein the information signals are managed device attribute signals.

9. The method of claim 6, wherein the plural agents include an agent operating under an SNMP management protocol.

10. The method of claim 6, wherein the plural agents include an agent operating under a CMIP management protocol.

11. In a computer system having plural processing modules and at least one peripheral device coupled via a network, each processing module including a manager for managing the at least one peripheral device using a predetermined one of plural management protocols and the at least one peripheral device having plural agents each using a different one of the predetermined management protocols for exchanging management information with the managers over the network, apparatus for interfacing the plural agents with the managed peripheral device, comprising:

receiving means for receiving signals from the managed peripheral device corresponding to predetermined events occurring in the managed device;

generating means for generating data corresponding to the predetermined events occurring in the managed device in response to the signals received from the managed peripheral device; and sending means for sending event corresponding data to more than one of the plural agents, each agent operating under the same management protocol as the management protocol of the processing module manager with which the agent exchanges management information, and each agent providing event corresponding data to its corresponding processing module manager.

12. The apparatus of claim 11, wherein the plural agents include an agent operating under an SNMP management protocol.

13. The apparatus of claim 11, wherein the plural agents include an agent operating under a CMIP management protocol.

14. In a computer system having plural processing modules and at least one peripheral device coupled via a network, each processing module including a manager for managing the at least one peripheral device using a predetermined one of plural management protocols and the at least one peripheral device having plural agents each using a different one of the predetermined management protocols for exchanging management information with the managers over the network, a method for interfacing the plural agents with the managed peripheral device, comprising the steps of:

receiving signals from the managed peripheral device corresponding to predetermined events occurring in the managed device;

generating data corresponding to the predetermined events occurring in the managed peripheral device in response to the received signals from the managed peripheral device; and sending event corresponding data to more than one of the plural agents, each agent operating under the same management protocol as the management protocol of the processing module manager with which the agent exchanges management information, and each agent providing the event corresponding data to its corresponding processing module manager.

15. The apparatus of claim 14, wherein the plural agents include an agent operating under an SNMP management protocol.

16. The apparatus of claim 14, wherein the plural agents include an agent operating under a CMIP management protocol.

17. In a computer system having plural processing modules and at least one peripheral device coupled via a network, each processing module including a manager for managing the at least one peripheral device using a predetermined one of plural management protocols, apparatus for interfacing the managed peripheral device to the network comprising:

plural agents each operating under a different one of the predetermined protocols;

means coupled between the plural agents and the managed device for exchanging signals with the managed device and for exchanging data with the plural agents;

means for sequentially activating the agents and the exchanging means, wherein, when one of the plural agents is activated and receives an information request from a requesting manager operating under the same management protocol, the activated agent generates a signal calling for information signals from the managed device, the exchanging means when activated sends the calling signal to the managed device, receives information signals from the managed device and generates data corresponding to the information signals, and the one of the plural agents when reactivated receives the data generated by the exchanging means and forms a response message in the same management protocol as the management protocol of the requesting manager.

18. The apparatus of claim 17, wherein the plural agents include an agent operating under an SNMP management protocol.

19. The apparatus of claim 17, wherein the plural agents include an agent operating under a CMIP management protocol.

20. In a computer system having plural processing modules and at least one peripheral device coupled via a network, each processing module including a manager for managing the at least one peripheral device using a predetermined one of plural management protocols and the at least one peripheral device having plural agents each using a different one of the predetermined management protocols for exchanging management information with the managers over the network, computer-executable process steps stored on a computer-readable medium of an apparatus which interfaces the plural agents with the managed peripheral device, the computer-executable process steps to interface the plural agents with the managed peripheral device, the computer-executable steps comprising:

code to receive an information request from one of the plural agents operating under the same management protocol as the management protocol of a manager requesting information; and code to determine whether the information request is for local information stored on the apparatus or for information stored on the managed peripheral device;

wherein, in a case that it is determined that the request is for information on the managed peripheral device, the process steps comprise:

code to send a calling signal to the managed peripheral device calling for information on the managed peripheral device;

code to receive information signals from the managed peripheral device in response to the calling signal;

code to generate data corresponding to the information signals from the managed device; and code to send the generated data to the one agent operating under the same management protocol as the management protocol of the requesting manager; and wherein, in a case that it is determined that the request is for local information, the computer-executable process steps comprise code to provide the local information to the one agent operating under the same management protocol as the management protocol of the requesting manager.

21. Computer-executable process steps according to claim 20, wherein the information signals are managed device status signals.

22. Computer-executable process steps according to claim 21, wherein the information signals are managed device attribute signals.

23. Computer-executable process steps according to claim 21, wherein the plural agents include an agent operating under an SNMP management protocol.

24. Computer-executable process steps according to claim 21, wherein the plural agents include an agent operating under a CMIP management protocol.

25. In a computer system having plural processing modules and at least one peripheral device coupled via a network, each processing module including a manager for managing the at least one peripheral device using a predetermined one of plural management protocols and the at least one peripheral device having plural agents each using a different one of the predetermined protocols for exchanging management information with the managers over the network, computer-executable process steps to interface the plural agents with the managed peripheral device, the computer-executable process steps comprising:

code to receive signals from the managed peripheral device corresponding to predetermined events occurring in the managed peripheral device;

code to generate data corresponding to predetermined events occurring in the managed peripheral device; and code to send event corresponding data to more than one of the plural agents, each agent operating under the same management protocol as the management protocol of the processing module manager with which the agent exchanges management information, and each agent providing the event corresponding data to its corresponding processing module manager.

26. Computer-executable process steps according to claim 25, wherein the plural agents include an agent operating under an SNMP management protocol.

27. Computer-executable process steps according to claim 25, wherein the plural agents include an agent operating under a CMIP management protocol.

28. In a computer system having plural processing modules and at least one peripheral device coupled via a network, each processing module including a manager for managing the at least one peripheral device using a predetermined one of plural management protocols and the at least one peripheral device having plural agents each using a different one of the predetermined management protocols for exchanging management information with the managers over the network, an apparatus including a computer-readable medium which stores computer-executable process steps to interface the plural agents with the managed peripheral device, the computer-executable process steps comprising:

a receiving step to receive an information request from one of the plural agents operating under the same management protocol as the management protocol of a manager requesting information; and a determining step to determine whether the information request is for local information stored on the apparatus or for information stored on the managed peripheral device;

wherein, in a case that the determining step determines that the request is for information on the managed peripheral device, the computer-executable process steps comprise:

a first sending step to send a calling signal to the managed peripheral device calling for information on the managed peripheral device;

a receiving step to receive information signals from the managed peripheral device in response to the calling signal;

a generating step to generate data corresponding to the information signals from the managed device; and a second sending step to send the generated data to the one agent operating under the same management protocol as the management protocol of the requesting manager; and wherein, in a case that the determining step determines that the request is for local information, the computer-executable process steps comprise a providing step to provide the local information to the one agent operating under the same management protocol as the management protocol of the requesting manager.

29. A computer-readable medium according to claim 28, wherein the information signals are managed device status signals.

30. A computer-readable medium according to claim 28, wherein the information signals are managed device attribute signals.

31. A computer-readable medium according to claim 28, wherein the plural agents include an agent operating under an SNMP management protocol.

32. A computer-readable medium according to claim 28, wherein the plural agents include an agent operating under a CMIP management protocol.

33. In a computer system having plural processing modules and at least one peripheral device coupled via a network, each processing module including a manager for managing the at least one peripheral device using a predetermined one of plural management protocols and the at least one peripheral device having plural agents each using a different one of the predetermined management protocols for exchanging management information with the managers over the network, a computer-readable medium which stores computer-executable process steps, the computer-executable process steps to interface the plural agents with the managed peripheral device, the computer-executable process steps comprising:

a receiving step to receive signals from the managed peripheral device corresponding to predetermined events occurring in the managed device;

a generating step to generate data corresponding to the predetermined events occurring in the managed device in response to the received signals from the managed device; and a sending step to send event corresponding data to more than one of the plural agents, each agent operating under the same management protocol as the management protocol of the processing module manager with which the agent exchanges management information, and each agent providing the event corresponding data to its corresponding processing module manager.

34. A computer-readable medium according to claim 33, wherein the plural agents include an agent operating under an SNMP management protocol.

35. A computer-readable medium according to claim 33, wherein the plural agents include an agent operating under a CMIP management protocol.

36. An apparatus which interfaces a peripheral device to plural managers operating in plural respective processing modules, each of the plural managers operating under a predetermined management protocol, the apparatus comprising:

a common interface, over which communications are exchanged with the plural managers over a common bus, the communications including requests for information and responses to the requests for information;

plural agents, each of which operates under a same management protocol as one of the plural managers, each of the plural agents for receiving, over the common interface, a request for information from a requesting manager having a management protocol which corresponds to a management protocol of the agent, and for providing requested information, including data from the peripheral device, to the requesting manager over the common interface; and a peripheral interface which, in a case that the requesting manager requests information on the peripheral device, generates calling signals in response to the request for information from the requesting manager, sends the calling signals to the peripheral device, receives data from the peripheral device in response to the calling signals, and transmits the data from the peripheral device to the agent having the same protocol as the requesting manager.

\* \* \* \* \*